US009821941B2

(12) United States Patent
Durin-France et al.

(10) Patent No.: US 9,821,941 B2
(45) Date of Patent: Nov. 21, 2017

(54) PACKAGING SHEET, PACKAGING AND USE OF SUCH A PACKAGING SHEET

(71) Applicant: AMCOR FLEXIBLES FRANCE, Barbezieux Saint Hilaire (FR)

(72) Inventors: Agnès Durin-France, Montelimar (FR); Donatien Coulon, Hommarting (FR); Jean-Jacques Provost, Barret (FR); Jean-Marie Nicolas Bonifacy, La Couronne (FR)

(73) Assignee: AMCOR FLEXIBLES FRANCE, Barbezieux Saint Hilaire (FR)

( * ) Notice: Subject to any disclaimer, the term of this patent is extended or adjusted under 35 U.S.C. 154(b) by 0 days.

(21) Appl. No.: 14/321,850

(22) Filed: Jul. 2, 2014

(65) Prior Publication Data

US 2015/0017292 A1 Jan. 15, 2015

(30) Foreign Application Priority Data

Jul. 3, 2013 (EP) .................................... 13305946

(51) Int. Cl.
*B26F 1/20* (2006.01)
*B32B 23/08* (2006.01)
(Continued)

(52) U.S. Cl.
CPC ............... *B65D 75/26* (2013.01); *B32B 3/266* (2013.01); *B32B 7/12* (2013.01); *B32B 7/14* (2013.01);
(Continued)

(58) Field of Classification Search
CPC ..... Y10T 428/24331; Y10T 428/31895; Y10T 428/15; B32B 27/10; B32B 3/00;
(Continued)

(56) References Cited

U.S. PATENT DOCUMENTS 4,861,632 A * 8/1989 Caggiano .................. B32B 7/02
206/204
4,977,031 A * 12/1990 Temple ................ B65D 81/264
426/126
(Continued)

FOREIGN PATENT DOCUMENTS

EP       0025431 A2    3/1981
EP       0368602 A2    5/1990
(Continued)

OTHER PUBLICATIONS

European Search Report dated Dec. 13, 2013 in related European Patent Application No. 13305946.9.
(Continued)

*Primary Examiner* — Lee E Sanderson
(74) *Attorney, Agent, or Firm* — Eric L. Lane; Green Patent Law

(57) ABSTRACT

A packaging sheet (1) which is intended for packaging a cheese product. The packaging sheet (1) comprises an internal membrane (5) and a printable external surface (10). The internal membrane comprises at least one internal plastic layer (7) intended to be oriented towards the cheese product and at least a first water-absorbing layer (12) made of a first water-absorbing material. The external surface (10) is intended to be oriented away from the cheese product. The or each internal plastic layer (7) has a plurality of microperforations (8, 9) arranged in a random fashion on the or each internal plastic layer (7) in such a manner that the aft permeability of the internal membrane (5) is comprised between 5 mL/min Bendtsen and 500 ml/min Bendtsen, the first water-absorbing material having a water absorption rate comprised between 1 and 30 g/m² as measured using the COBB test $C_{3600}$.

20 Claims, 5 Drawing Sheets

(51) Int. Cl.
*B32B 3/26* (2006.01)
*B65D 85/76* (2006.01)
*B65D 75/26* (2006.01)
*B32B 7/12* (2006.01)
*B32B 7/14* (2006.01)
*B32B 27/10* (2006.01)
*B65D 81/26* (2006.01)

(52) U.S. Cl.
CPC ............ *B32B 27/10* (2013.01); *B65D 81/264* (2013.01); *B65D 85/76* (2013.01); *B32B 2250/03* (2013.01); *B32B 2307/724* (2013.01); *B32B 2307/726* (2013.01); *B32B 2439/70* (2013.01); *Y10T 428/24322* (2015.01); *Y10T 428/24331* (2015.01)

(58) Field of Classification Search
CPC ..... B32B 3/30; B32B 2439/70; B65D 81/267; B26F 14/20
USPC ......... 428/34.2, 34.3, 35.7, 34.6, 34.8, 35.2, 428/35.6, 35, 36.1, 36.2, 138; 426/118, 426/127, 130, 582
See application file for complete search history.

(56) References Cited

U.S. PATENT DOCUMENTS

| | | | | |
|---|---|---|---|---|
| 5,492,705 A | * | 2/1996 | Porchia | .................. B65D 33/01 383/103 |
| 2010/0221462 A1 | * | 9/2010 | Forsyth | ..................... B26F 1/24 428/34.1 |

FOREIGN PATENT DOCUMENTS

| | | | |
|---|---|---|---|
| FR | 2531682 A1 | 2/1984 | |
| FR | 2716174 A1 | 8/1995 | |
| GB | 2355956 A * | 5/2001 | .............. B32B 7/02 |
| WO | WO 01/04416 A1 | 1/2001 | |

OTHER PUBLICATIONS

International Search Report and Written Opinion dated Sep. 21, 2012 in International Patent Application No. PCT/IB2012/000251.

* cited by examiner

PACKAGING SHEET, PACKAGING AND USE OF SUCH A PACKAGING SHEET

CROSS-REFERENCE TO RELATED APPLICATION

This application claims priority to European Patent Application No. 13305946.9, filed Jul. 3, 2013, which is hereby incorporated by reference in its entirety.

BACKGROUND AND SUMMARY

The present invention concerns a packaging sheet intended for packaging a cheese product, the packaging sheet comprising:

an internal membrane, comprising at least one internal plastic layer intended to be oriented towards the cheese product and at least a first water-absorbing layer made of a first water-absorbing material;

a printable external surface, the external surface being intended to be oriented away from the cheese product.

FR 2 716 174 discloses a packaging sheet for packaging cheese products, which comprises:

an internal membrane formed of a layer of paper, which is coated with paraffin on its internal surface, i.e. on its surface intended to be oriented towards the packaged cheese product; and an external membrane, intended to be oriented towards the exterior of the package, i.e. away from the cheese product and made of a plastic material mixed with a water absorbing substance. The external plastic membrane is microperforated.

However, such a packaging sheet is not entirely satisfactory. Indeed, there is a direct contact between the packaged cheese product and the paraffin of the internal membrane, whose role is to prevent molds, and in particular the *penicillium* and/or *geotricium*, present on the cheese product, from growing on the paper of the internal membrane. Use of paraffin in the food packaging industry is being more and more frowned upon due to potential health issues stemming from its use. Therefore, it is desirable to avoid the presence of paraffin when developing packaging.

Moreover, extending the conservation time of cheese is a concern for cheese manufacturer. The packaging sheet of FR 2 716 174 is not entirely satisfactory in this regard, because the water and air flow through the packaging from the cheese product to the atmosphere is insufficiently controlled.

One of the purposes of the present invention is to provide a packaging sheet which is adapted for extending the conservation time of cheese, especially Camembert type soft cheese, while at the same time avoiding the use of paraffin.

To this end, according to a first aspect of the invention, the or each internal plastic layer has a plurality of microperforations arranged in a random fashion on the or each internal plastic layer in such a manner that the air permeability of the internal membrane is comprised between 5 mL/min Bendtsen and 500 mL/min Bendtsen, the first water-absorbing material having a water absorption rate comprised between 1 and 30 g/m$^2$ as measured using the COBB test $C_{3600}$.

The random distribution of the microperforations results, where wanted, in a very uniform permeability and allows for a good control of the air and water exchanges through the packaging sheet.

The Applicant has found that a key aspect for extending the conservation time of the cheese is promptly removing the liquid water under the form of microdroplets located on the outer surface of the cheese product, on the cheese flora.

The air permeability range and the water absorption range mentioned above are well suited for that purpose. The air permeability is representative of the number of microperforations and of the total surface area of the microperforations. Said parameters are important to ensure that the liquid water located on the cheese flora will pass through the internal layer and reach the water-absorbing layer. The water absorption rate is important to make sure that water is properly kept away from the cheese product surface.

The ranges above allow for a sufficient evacuation of the water in liquid and vapor state without drying out the cheese. The first water-absorbing layer retains the water transferred from the cheese product through the microperforations of the internal membrane. It acts as a buffer and prevents the dehydration of the cheese product. The presence of the first water-absorbing layer allows for an improved control of the rate of flow through the packaging sheet.

The microperforations comprise through-holes extending through the or each internal plastic layer and blind-holes which open out on the internal surface of the innermost internal plastic layer.

A preferred range for the air permeability of the internal membrane is comprised between 5 mL/min Bendtsen and 500 mL/min Bendtsen, particularly between 10 mL/min Bendtsen and 200 mL/min Bendtsen, between 10 mL/min Bendtsen and 50 mL/min Bendtsen or even between 10 mL/min Bendtsen and 30 mL/min Bendtsen. A preferred range for the water absorption rate of the first water-absorbing material is comprised between 1 and 30 g/m$^2$ as measured using the COBB test $C_{3600}$, particularly between 3 and 25 g/m$^2$ as measured using the COBB test $C_{3600}$, and between 10 and 22 g/m$^2$ as measured using the COBB test $C_{3600}$. Any air permeability range can be combined with any water absorption range. A particularly preferred combination is an air permeability range between 10 mL/min Bendtsen and 50 mL/min Bendtsen, with a water absorption range between 2 and 22 g/m$^2$ as measured using the COBB test $C_{3600}$ and even 10 to 30 ml/min Bendtsen combined with 10 to 22 g/m$^2$ as measured using the COBB test $C_{3600}$. Said combination is well suited for the maturation of soft cheese with white rind, such as Camembert or Brie.

The air permeability is measured using the method disclosed in the international standard ISO 5636-3. It is for example measured using the air permeance tester sold by the company Lorentzen & Wettre used in Bendtsen measure mode.

Although in the present specification, the air permeability ranges are expressed in mL/min Bendtsen and measured using the Bendtsen method, any other air permeability unit and corresponding method can be used for measuring the air permeability. In this case, the claimed and disclosed ranges should be converted from mL/min Bendtsen into these other units.

The water-absorption rate is measured using the COBB test $C_{3600}$, which is well known in the art. The procedural standards used are the same as those explained in TAPPI T441 except for the duration of the test, which lasts one hour ($C_{3600}$) instead of 60 seconds ($C_{60}$) as described in TAPPI T441.

Other features of the packaging sheet according to the invention will be described hereafter.

The density of microperforations on an internal surface of the internal plastic layer is comprised between 500 and 5000 microperforations per dm$^2$, preferably comprised between 1000 and 4000 microperforations per dm$^2$, and even more preferably between 1600 and 3000 microperforations per dm$^2$.

Said densities are average values, on at least 50% of the surface area of the packaging sheet.

The density range is well suited for obtaining the required range for the air permeability of the internal membrane. It is adapted for extending the conservation time of a cheese product, especially a Camembert type soft cheese.

The first water-absorbing material is a cellulose-based material. The first water absorbing layer is for example made of paper, preferably of Kraft type paper.

Preferably, the first water-absorbing material has a surface weight (grammage) comprised between 20 and 70 g/m², and in particular a grammage of 25 to 45 g, more particularly of 30 to 50 g, and for example 32 g.

Optionally, the packaging sheet further comprises a second water-absorbing layer made of a second water-absorbing material. The second water-absorbing layer is superimposed on the first water-absorbing layer. The second water-absorbing layer provides additional water storage capacity. It is particularly useful for packaging very wet cheeses. The second water-absorbing material is a cellulose-based material. The second water-absorbing layer is for example a cellulose film or a layer of paper, preferably of Kraft type paper. The second paper layer for example has a grammage of 20 to 40 g, and in particular a grammage comprised between 21 and 25 g.

The or each internal plastic layer preferably comprises one of a petroleum-based plastic material, a plastic material derived from renewable sources or a mixture of a petroleum-based plastic material and a plastic material derived from renewable sources.

Petroleum-based plastic materials are plastic materials that are derived from petroleum. The petroleum-based plastic material is for example chosen among: polyethylene (PE), in particular low density polyethylene, linear low density polyethylene or metallocene, polyamide (PA), polypropylene (PP), polyester, ethylene methyl acrylate (EMA), ethylene butyl acrylate (EBA), ethylene acrylic acid (EAA) or a ionomer and their blends, and other materials or resins that would be well known by those skilled in the art.

Plastic materials derived from renewable sources are plastic materials comprising carbons of renewable origin. These carbons are for example extracted from the biomass (e.g. from corn, wheat, soy or pine trees) or produced by microorganisms. The plastic materials derived from renewable sources are for example: polylactic acid (PLA), polyhydroxybutyrate (PHB) or their mixtures, polyhydroxyalkanoates (PHA) or blends of PLA with Mater-Bi® sold by the company Novamont, and other materials or resins that would be well known by those skilled in the art.

Plastic materials derived from renewable sources are more environment-friendly than petroleum-based plastic materials since they derive from renewable resources rather than fossil resources.

Optionally, the internal membrane comprises at least two superimposed internal plastic layers. In one embodiment, at least two of the internal plastic layers are made of different plastic materials. For example, the innermost internal plastic layer is made of a material that adheres poorly to the first water-absorbing layer and the outermost internal plastic layer is made of a plastic material that adheres well to the first water-absorbing layer. In this case, the outermost internal plastic layer promotes adhesion of the innermost internal plastic layer to the first water-absorbing layer. Providing different internal plastic layers made of different plastic material may also allow for adjusting the mechanical or chemical properties of the internal membrane depending on the different plastic materials used. In another embodiment, all the internal plastic layers are made of the same plastic material. Providing several superimposed internal plastic layers rather than one single internal plastic layer made in one piece also modifies the properties, e.g. the mechanical properties, of the internal membrane.

Optionally, the internal plastic layer may have areas having different densities of microperforations. This feature allows tailoring the flow of water and air in a given area of the packaging sheet to the area of the cheese product, it is intended to surround. It thus allows creating different functional areas on the packaging sheet. Different values of permeability are thus obtained in these different areas.

The greatest dimension of the microperforations of the internal plastic layer in the plane of the internal plastic layer is preferably comprised between 10 and 500 μm. Having microperforations with sizes in this range increases the duration of conservation of the packaged cheese product.

According to one embodiment, the packaging sheet further comprises an external layer which is at least partially bonded to the internal membrane, the external surface being formed by a surface of the external layer oriented away from the internal membrane. The external layer helps control the rate of desorption of the water from the first water-absorbing layer towards the environment.

The external layer is for example made of a plastic material.

The external plastic layer preferably comprises one of a petroleum-based plastic material, a plastic material derived from renewable sources or a mixture of a petroleum-based plastic material and a plastic material derived from renewable sources.

The petroleum-based plastic material is for example chosen among those cited above in respect of the internal plastic layer.

The plastic material derived from renewable sources is for example chosen among those cited above in respect of the internal plastic layer.

The external layer can made of an aluminum foil as well. Such external layer is well suited for packaging cheese with a low water content or which are sensitive to gas, particularly oxygen.

Alternatively, the external layer is a paper layer.

According to one embodiment, the external layer is perforated.

A first possibility is having the microperforations arranged in a random fashion. The microperforations are obtained in the same way as the microperforations of the internal plastic layer.

Alternatively, the external layer has microperforations arranged in a regular pattern. The external layer can be perforated for example using needles for example. In this case, the microperforations form a regular pattern, repeated over the external layer.

In both cases, the air permeability of the external layer is preferably comprised between 0.1 and 40000 mL/min Bendtsen, preferably between 10 to 10000 mL/min Bendtsen, even preferably between 500 and 5000 mL/min Bendtsen. This air permeability is in particular obtained through the presence of microperforations in the external layer. These microperforations allow for a good control of the diffusion of the water vapour through the external layer, which is desirable. Indeed, if the flow rate is too rapid, the first water-absorbing layer will dry out quickly and suck more humidity from the cheese resulting in a drying out of the packaged cheese. On the contrary, a flow rate that is too slow may result in a degradation of the cheese flora, the formation of condensation on the internal surface or a deterioration of the packaging sheet, and in particular of the paper layers that are possibly present.

According to one embodiment, the air permeability of the external layer is greater than the air permeability of the internal membrane. Such a permeability gradient increases the speed of desorption of the water from the water-absorbing layer. It is adequate for example for packaging sheets intended for packaging cheese products having a weight loss of about 3 to 8%, in particular of about 4 to 5%.

According to another embodiment, the air permeability of the external layer is smaller than the air permeability of the internal membrane. Such a permeability gradient reduces the flow of air and water through the external layer from the water-absorption layer to the environment. It is advantageous for cheese products having a weight loss during maturation smaller than 2.5%, more particularly smaller than 1.5%, or when it is desirable to promote the retention of the water in the water-absorbing layer, rather than its desorption from this layer.

According to one embodiment, the external layer is only partially bonded to the internal membrane, for example along a set of bonding points, lines and/or graphic symbols. Adequate adhesives are for example a hotmelt adhesive, a pressure-sensitive adhesive or a water-based adhesive, such as a dextrin or a casein based adhesive. The adhesive is transparent or colored. A partial bonding between the external layer and the internal membrane allows for the needed evacuation of the water vapour comprised in the internal membrane.

In another embodiment, the external layer is bonded to the internal membrane along its entire surface facing the internal membrane. Adequate adhesives are for example waxes, such as petroleum-based waxes or waxes derived from renewable sources, pressure sensitive adhesives, water-based adhesives or adhesives comprising polyurethane, polyester, or polyurethane or polyester derivates.

The external layer is bonded to the internal membrane directly or indirectly e.g. through the second water-absorbing layer.

In one embodiment, the external surface is formed on the internal membrane. According to one more particular embodiment, the packaging sheet is in the form of a single sheet. "Single sheet" means that the different layers are formed onto one another for example by extrusion of one layer onto another, rather than being formed separately and later adhered to one another. A packaging sheet in the "single-sheet" form is advantageous since its production cost is reduced compared to a "multisheet" packaging sheet.

According to one embodiment, the first water-absorbing layer is made of paper having a grammage between 30 and 40 g, the internal plastic layer being made of polyethylene having a surface weight between 10 and 12 $g/m^2$, the air permeability of the internal membrane being comprised between 10 mL/min Bendtsen and 50 mL/min Bendtsen, preferably between 10 and 30 mL/min Bendtsen, the first water-absorbing material having a water absorption rate comprised between 10 and 22 $g/m^2$ as measured using the COBB test $C_{3600}$.

Preferably, the packaging sheet in this case comprises an external layer partially bonded to the internal membrane, made of oriented polypropylene, for example 20 μm thick.

The invention also relates to a packaging comprising the packaging sheet as described above and a cheese product, arranged in the packaging sheet in such a way that the internal plastic layer is oriented towards the cheese product.

Preferably, the cheese product is one of a soft cheese, a fresh cheese or a blue cheese, even though other types of cheese products can be packaged in the packaging sheet. The packaging sheet is particularly suited to packaging a soft cheese with a white rind, such as Camembert or Brie.

In one embodiment, the packaging sheet is folded around the food product. The packaging sheet is not sealed to itself in a gas tight fashion. In another embodiment, the packaging sheet is sealed to itself, typically along a weld line, in a gas tight fashion. It creates a gas tight chamber where the cheese product is received. The packaging sheet is for example a flow pack in this case.

The invention also relates to the use of a packaging sheet having the features above, for packaging a cheese product in order to slow the maturation of the cheese product, in such a way that the NPT/NT ratio is lower than 13 after 45 days of maturation, preferably lower than 12.5 after 45 days of maturation, NPT being the quantity of nitrogen soluble in phosphotungstic acid, NT being the total quantity of nitrogen, the ratio NPT/NP being assessed using the Kjeldhal method according to the amended standard NF ISO8968-1.

BRIEF DESCRIPTION OF THE DRAWINGS

The features of the invention will be apparent from the following description with reference to the accompanying drawings wherein.

DETAILED DESCRIPTION

The packaging sheet according to the invention is intended for packaging cheese products, typically a soft cheese, a fresh cheese or a blue cheese. The packaging sheet is particularly suited to packaging a soft cheese with a white rind, such as Camembert or Brie.

It is particularly adapted as well for packaging a moisture-sensitive cheese products, the packaging sheet controlling the moisture and/or the exudates originating from the cheese product after it has been packaged, and allowing for an extended conservation time.

Figure 1:
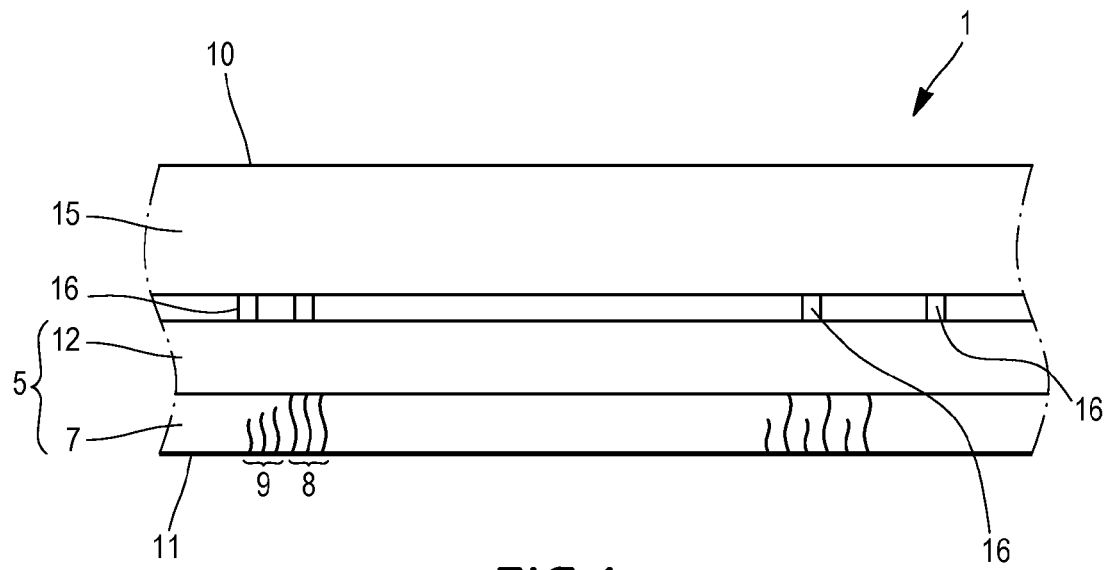
FIG. 1 is a diagrammatic cross-section of a packaging sheet according to a first embodiment of the invention.

A packaging sheet 1 according to a first embodiment of the invention is shown on FIG. 1. It comprises an internal membrane 5 intended to be oriented towards the product to be packaged. The internal membrane 5 is therefore intended to be on the inside of the finished package.

It also comprises an external surface 10, intended to be oriented away from the product to be packaged. The external surface 10 may be the outermost surface of the packaging sheet 1. However, the packaging sheet 1 may further comprise a layer of varnish and/or ink superimposed onto the external surface 10. The varnish is intended for protecting the external surface 10 against aggressions from the environment. It may also be used to provide a glossy aspect to the external surface 10. The external surface 10 is visible from the outside.

The external surface 10 is a printable surface. A printable surface is a surface that can be printed upon without the need of additional treatments, for example for increasing the adherence of the print on the surface. For example, a paraffin coated surface is not a printable surface.

The internal membrane 5 comprises an internal plastic layer 7. The internal plastic layer 7 is the layer of the internal membrane 5 that is intended to be oriented towards the product wrapped in the packaging sheet.

Figure 2:
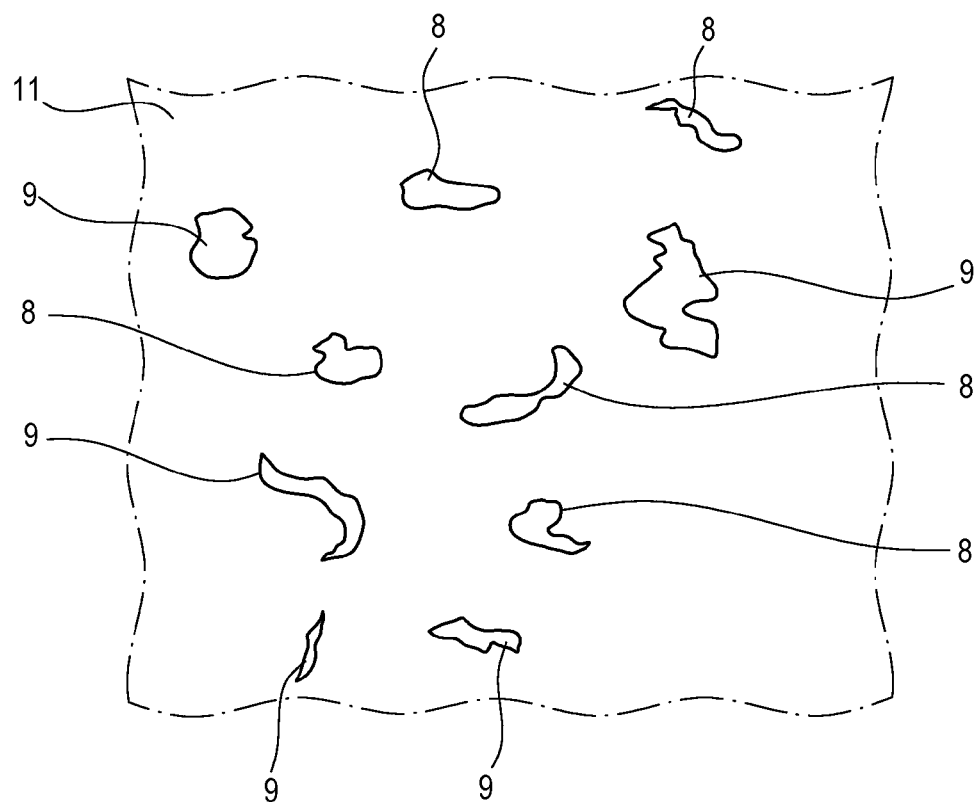
FIG. 2 is a diagrammatic plane view from below of the internal plastic layer of the packaging sheet shown in FIG. 1.

The internal plastic layer 7 has a plurality of randomly distributed microperforations. "Randomly distributed" in particular means that the distance between two adjacent microperforations, taken in the plane of the internal plastic layer 7, is not constant. At least over a surface of the internal layer 7 having an area substantially equal to that of the active surface of the tool used for making the microperforations, the microperforations do not define a pattern that is repeated periodically. Further, the shapes of the microperforations are variable. The dimensions of the microperforations in the plane of the internal plastic layer 7 are also variable from one microperforation to the other. This feature is illustrated on the diagrammatic representation of FIG. 2.

The greatest dimension of the microperforations of the internal plastic layer 7 in the plane of the internal plastic layer 7 is comprised between 10 and 500 μm, preferably between 10 and 250 μm, and more particularly between 20 and 200 μm. This means that the width of any microperforation taken along any direction comprised in the plane of the internal plastic layer 7 is smaller or equal to a maximum value comprised in the above mentioned ranges.

The length of the microperforations, taken in a transverse direction, perpendicular to the plane of the internal plastic layer 7, is also variable. Some microperforations 8 are through-holes that extend through the entire thickness of the internal plastic layer 7. Other microperforations 9 are blind-holes whose length is smaller than the thickness of the internal plastic layer 7. Each microperforation 9 of the latter type thus forms a recess or a cavity in the internal surface 11 of the internal plastic layer 7. As a whole, the microperforations confer microporosity to the internal plastic layer 7.

The presence of cavities or recesses on the internal surface 11 is particularly advantageous. Indeed, the internal surface 11 is the surface intended to be in contact with the cheese product wrapped in the packaging sheet 1. The cheese flora, and in particular the *penicillium*, can develop in these cavities, which has a very positive effect on the maturation of the cheese.

The microperforations may be obtained using a cylinder fitted with randomly distributed projections of different shapes and lengths, these projections being suitable for indenting or perforating the internal plastic layer 7. "Randomly distributed" in particular means that the distance between two adjacent projections is not constant. More particularly, the projections fitted on the cylinder do not define a pattern that is repeated periodically over the cylinder. The microperforations on the internal layer 7 are distributed randomly on the internal layer 7, i.e. in such a way that, at least over an area that is equal to that of the lateral surface of the cylinder, they do not define a pattern that is repeated periodically. A suitable tool is for example a cylinder fitted with diamond points.

The density of microperforations on the internal surface 11 of the internal plastic layer is high. The density of microperforations on the internal surface of the internal plastic layer is comprised between 500 and 5000 microperforations per $dm^2$, preferably comprised between 1000 and 4000 microperforations per $dm^2$, and even more preferably between 2000 and 3500 microperforations per $dm^2$.

Said densities are average values, on at least 50% of the surface area of the packaging sheet.

The random distribution of the microperforations contributes to obtaining this high density of microperforations.

The microperforations are distributed on the internal plastic layer 7 in such a manner that the air permeability of the internal membrane 5 is comprised between 5 and 500 mL/min Bendtsen. Advantageously, the air permeability of the internal membrane 5 is comprised between 10 and 200 mL/min Bendtsen, and more preferably between 10 and 50 mL/min Bendtsen, or even between 10 and 30 mL/min Bendtsen.

The air permeability of the internal membrane 5 can for example be modified by varying the pressure exerted by the tool, e.g. the cylinder, on the layer 7 to be microperforated.

The internal plastic layer 7 has areas having different densities of microperforations.

In another embodiment, all the areas of the internal plastic layer 7 have the same density of microperforations.

The internal plastic layer 7 comprises one of a petroleum-based plastic material, a plastic material derived from renewable sources or a mixture of a petroleum-based plastic material and a plastic material derived from renewable sources.

The petroleum-based plastic material is for example chosen among: polyethylene (PE), in particular low density polyethylene, linear low density polyethylene or metallocene, polyamide (PA), polypropylene (PP), polyester, ethylene methyl acrylate (EMA), ethylene butyl acrylate (EBA), ethylene acrylic acid (EAA) or a ionomer and their blends.

The plastic materials derived from renewable sources are for example: polylactic acid (PLA), polyhydroxybutyrate (PHB) or their mixtures, polyhydroxyalkanoates (PHA) or blends of PLA with Mater-Bi® sold by the company Novamont The internal plastic layer 7 for example has a weight per square meter comprised between 3 and 20 g, more particularly between 6 and 12 g, even more particularly between 10 and 12 g.

The zones in which the thickness of the internal plastic layer 7 is reduced due to the presence of microperforations are zones of preferred water vapour passage. The microperforations 8 which extend through the entire thickness of the internal plastic layer 7 allow the passage of air, water vapour and liquid water.

The distribution and shape of the microperforations described above is particularly advantageous. Indeed, the high density of micrometric perforations allows for a homogenous distribution of the exchange sites over the internal surface and therefore for a homogenous flow of air and water through the internal membrane.

On the contrary, when the perforations are made using needles that are regularly distributed on a cylinder, the resulting arrangement of perforations is regular and not random. The density of perforations is also much lower than with the microperforations according to the invention. Therefore, an internal layer which is perforated with needles presents localized surface areas of high flow of water or air through the internal membrane where the perforations are located and large areas of zero flow through the internal membrane between the perforations. The presence of such local areas in the internal membrane results in a degradation of the cheese flora. Thus, the absence of such localized surface areas which is achieved in the packaging sheet according to the invention is very advantageous for the maturation of the cheese.

This distribution of microperforations according to the invention also allows for a complete and rapid removal of the liquid and gaseous water originating from the cheese. Thus, the risk of formation of condensation on the inside of the packaging is significantly reduced.

As shown on FIG. 1, the internal membrane 5 further comprises a first water-absorbing layer 12 made of a first water-absorbing material and superimposed on the internal plastic layer 7. The first water-absorbing material is for example a cellulose-based material, such as cellulose film or paper. Advantageously, the first water-absorbing layer 12 is a layer of paper, typically Kraft paper. Preferably, the layer of paper is machined-glazed or calendered.

The first water-absorbing layer 12 is bonded to the internal plastic layer 7. For example, the internal plastic layer 7 is extruded onto the first water-absorbing layer 12. According to an alternative, the or each internal plastic layer 7 is formed separately from the first water-absorbing layer 12 and is then bonded to the first water-absorbing layer 12 before forming the microperforations 8, 9 in the or each internal plastic layer 7. According to another alternative, the plastic material forming the internal plastic layer is dissolved in a water-based solvent or organic-based solvent, and the first water-absorbing layer 12 is coated with the solvent.

The internal plastic layer 7 provides support to the first water-absorbing layer 12, which is in particular a layer of paper and thus increases its wet strength. It is therefore possible to use for the first water-absorbing layer 12 paper of different quality or paper which has not been previously treated with wet-strength resin.

The first paper layer 12 for example has a grammage of 20 to 70 g, and in particular a grammage of 20 to 40 g, more particularly of 32 to 40 g, and for example 32 g.

The water absorption rate of the first water-absorbing material is comprised between 1 and 30 g/m$^2$ as measured using the COBB test $C_{3600}$. A preferred range for the water absorption rate of the first water-absorbing material is comprised between 3 and 25 g/m$^2$ as measured using the COBB test $C_{3600}$, and a more preferred range is between 10 and 22 g/m$^2$ as measured using the COBB test $C_{3600}$.

In the first embodiment, the packaging sheet 1 further comprises an external layer 15, which is at least partially bonded to the internal membrane 5. In this embodiment, the external surface 10 is formed by a surface of the external layer 15 intended to be oriented away from the packaged product. Alternatively, the external, printable surface 10 is formed by a surface of the external layer 15 intended to be oriented toward the packaged product, and the external layer 15 is transparent.

The external layer 15 is adhesively bonded to the internal membrane 5. The external layer 15 is for example adhered only partially to the internal membrane 5. The adhesive is for example sprayed or coated onto one or both of the surfaces of the internal membrane 5 and of the external layer 15 intended to be bonded to one another. The adhesive may be transparent or coloured. The external layer 15 is for example adhered to the internal membrane 5 along a set of bonding points and/or lines 16. Adequate adhesives are for example a hotmelt adhesive, a pressure-sensitive adhesive or a water-based adhesive, such as a dextrin or a casein based adhesive.

The adhesive may also form a graphic symbol, such as a brand mark, a letter, a word or a drawing. In this case, the adhesive is chosen in such a manner that, when dry, it contrasts with the underlying and/or overlying layers. The graphic symbol formed by the adhesive is visible from the exterior and/or the interior of the package.

The external layer 15 has a plurality of microperforations distributed in a random fashion. The microperforations are arranged in such a way that the air permeability of the external layer 15 is comprised between 0.1 and 40000 mL/min Bendtsen.

The microperforations on the external layer 15 are arranged in such a way that the air permeability of the external layer 15 is greater than the air permeability of the internal membrane 5. This feature promotes the extraction of the water and prevents the formation of condensation at the interface between the product and the internal membrane, especially for cheese products which have a high weight loss during maturation.

The microperforations are of the same type as those formed on the internal layer plastic layer 7.

In an alternative, the microperforations form a regular pattern on the external layer 15. All the microperforations have a similar shape. All the microperforations are through-holes, i.e. they extend through the entire thickness of the external layer 15 and are open at both ends. These regular microperforations may for example be formed by means of a cylinder fitted with a plurality of identical needles arranged on the cylinder according to a regular pattern. In this alternative, the microperforations are therefore not randomly distributed.

Advantageously, the external layer 15 is made of a plastic material, chosen among the materials listed above in relation with the internal plastic layer 7.

An alternative of the first embodiment shown in FIG. 3 will be described below. Only the aspects by which the packaging sheet of FIG. 3 differs from the packaging sheet of FIG. 1 will be detailed below.

Figure 3:
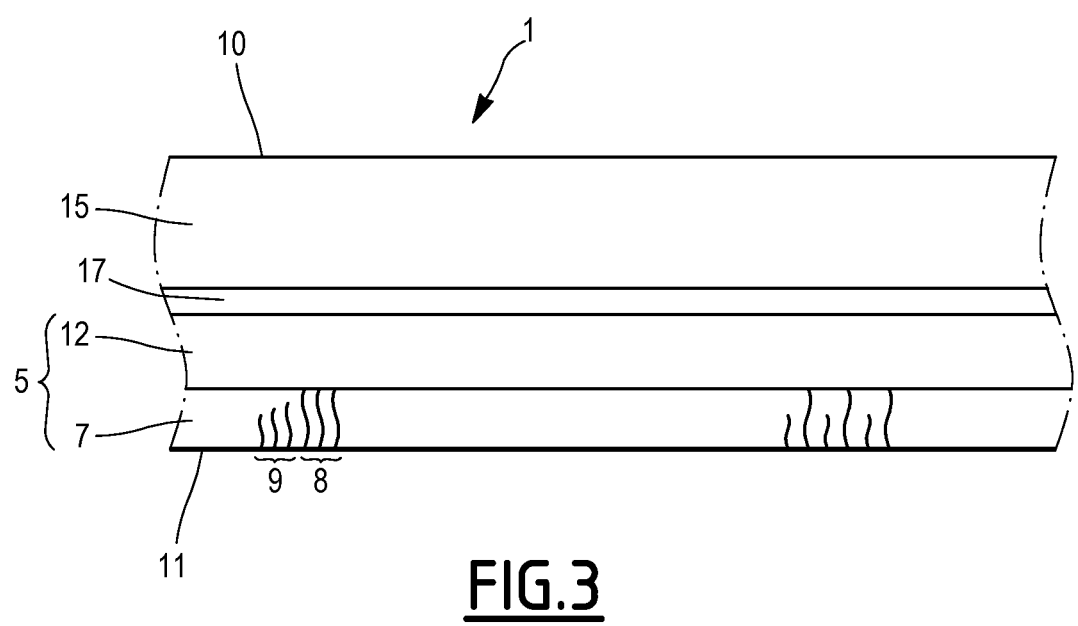
FIG. 3 is a diagrammatic cross-section of a packaging sheet according to an alternative of the first embodiment.

As shown on FIG. 3, the external layer 15 is bonded to the internal membrane 5 along its entire surface facing the internal membrane 5 ("full surface bonding"). The internal membrane 5 and the external layer 15 are for example adhered to one another along their entire facing surfaces using a layer of adhesive 17. Adequate adhesives are waxes, for example petroleum-based waxes or waxes derived from renewable sources, pressure sensitive adhesives, water-based adhesives or adhesives comprising polyester and/or polyurethane or polyurethane derivates. The adhesive may be coated or sprayed onto one or both of the entire facing surfaces of the internal membrane 5 and of the external layer 15. In another embodiment, the full surface bonding between the external layer 15 and the internal membrane 5 is obtained by extrusion laminating a layer of resin, for example of polyethylene, onto at least one of the facing surfaces of the internal membrane 5 and of the external layer 15.

In the case of a full surface bonding, the water-absorbing layer should have a higher water absorption capacity than in the case of a partial bonding in order to prevent water retention between the packaging sheet 1 and the packaged product.

The external layer 15 is made of an aluminium foil.

Alternatively, the external layer 15 is made of a plastic material, chosen among the materials listed above in relation with the internal plastic layer 7.

In this case, a first possibility is that the external layer 15 does not have any perforations or holes. As a consequence the air permeability of the external layer 15 is very small and can be considered equal to zero. The air permeability of the external layer 15 is thus smaller than that of the internal membrane 5.

A second possibility is that the external layer 15 has a plurality of microperforations distributed in a random fashion, of the same type as those of the internal layer 7. The air permeability of the external layer 15 is comprised between 0.1 and 80000 mL/min Bendtsen.

Figure 4:
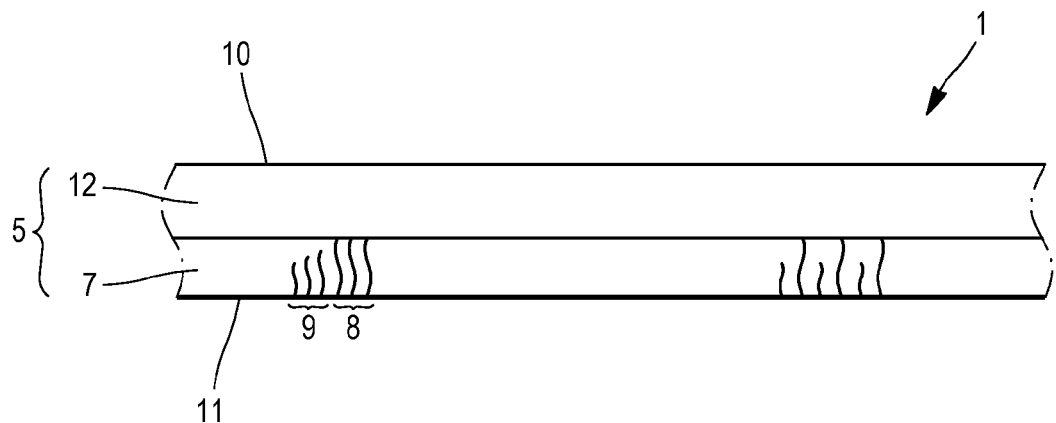
FIG. 4 is a diagrammatic cross-sections of a packaging sheet according to a second embodiment of the invention.

A packaging sheet 1 according to a second embodiment is illustrated on FIG. 4. Only the aspects by which the packaging sheet of FIG. 4 differs from the packaging sheet of FIG. 1 will be detailed below.

The packaging sheet of FIG. 4 differs from those of FIGS. 1 and 3 only in that it does not comprise an external layer 15. In the fourth embodiment, the packaging sheet 1 consists of the internal membrane 5. The external surface 10 is formed by the outer surface of the internal membrane 5, i.e. by the outer surface of first water-absorbing layer 12. A layer of varnish and/or ink (not shown) may be applied onto the external surface 10.

Figure 5:
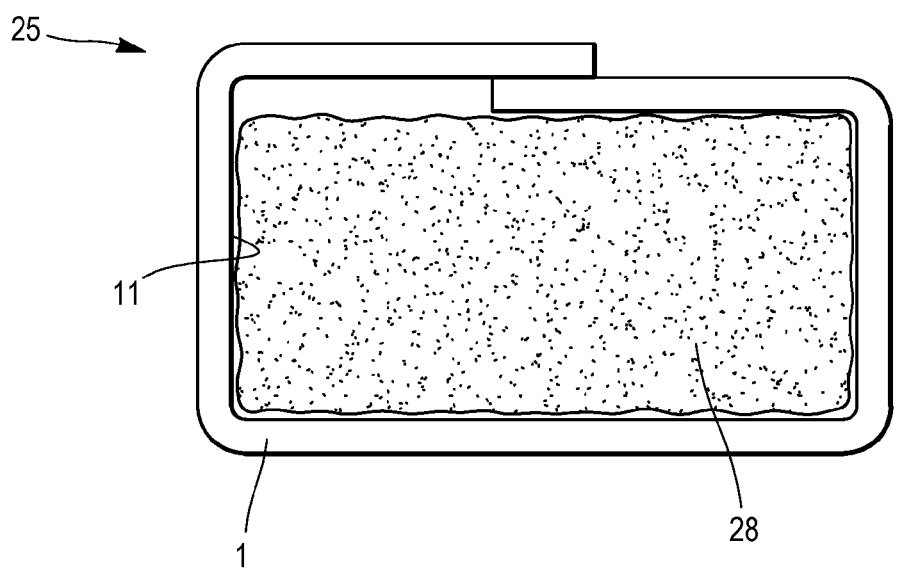
FIG. 5 is a diagrammatic view of a packaging according to the invention.

The invention also relates to a packaging 25, illustrated diagrammatically on FIG. 5, comprising a packaging sheet 1 as described above and a cheese product 28. The cheese product 28 is wrapped in the packaging sheet 1 in such a way that the internal surface 11 of the internal membrane 5 faces, or is even in contact with, the cheese product 28. The cheese product 28 is wrapped in the packaging sheet 1 in such a way that all the exchanges of air and water between the cheese product 28 and the environment 30 surrounding the packaging 25 take place through the packaging sheet 1, and are therefore regulated by the packaging sheet 1.

The behaviour of several examples of packaging sheets according to the invention has been tested and compared with existing packaging sheets.

Three series of tests were carried out in parallel, in the same conditions. The results presented below correspond to the average of the three series.

Each packaging sheet was wrapped around a piece of freshly prepared Camembert, and stored in a wooden box of the type usually used for conditioning Camembert. The box was stored in a refrigerated room at 4° C. for 35 days, and at 8° C. for 10 additional days (between day 35 and day 45).

Four packaging sheets according to the invention were tested (C to F sheets), along with a standard packaging sheet (T sheet) and a so-called Expeco sheet (A sheet).

The standard sheet has an external layer of OPP 20 μm thick, adhesively bonded by lines of glue to a water-absorbing layer of Kraft paper, and an internal layer of paraffin.

The Expeco sheet has an external layer of OPP 20 μm thick, adhesively bonded by lines of glue to a water-absorbing layer of Kraft paper, an internal layer of polyamide, with an intermediate layer of polyethylene between the paper and polyamide layers.

All the packaging sheets according to the invention have an external layer of oriented polypropylene (OPP) 20μ thick, adhesively bonded by lines of glue to a water-absorbing layer of Kraft paper, and a polyethylene (PE) internal layer.

The OPP is microperforated, with an air permeability between 1000 and 3000 mL/min Bendtsen.

Sheet C has a paper layer with a grammage of 30 g, and a PE layer with a grammage of 10 g. The PE internal layer is treated to form microperforations, with an indicia of 40. The indicia is representative of the density of microperforations on the internal plastic layer, in other words the number of microperforations per dm² of the plastic internal layer.

Sheet D has a paper layer with a grammage of 30 g, and a PE layer with a grammage of 10 g. The PE internal layer is treated to form microperforations, with an indicia of 20.

Sheet E has a paper layer with a grammage of 40 g, and a PE layer with a grammage of 12 g. The PE internal layer is treated to form microperforations, with an indicia of 50.

Sheet F has a paper layer with a grammage of 40 g, and a PE layer with a grammage of 12 g. The PE internal layer is treated to form microperforations, with an indicia of 20.

For each packaging sheet, the air permeability of the internal membrane was measured using the Bendtsen method. The water absorption rate of the water-absorbing material was measured as well, using the COBB test.

The results are indicated in the table below.

|   | Bendtsen ml/min · 50 cm² | Cobb $C_{3600}$ g/m² |
| --- | --- | --- |
| T | 16.3 | — |
| A | 1.43 | — |
| C | 21.50 | 23.92 |
| D | 20.93 | 13.02 |
| E | 13.03 | 26.82 |
| F | 11.40 | 10.28 |

Figure 6:
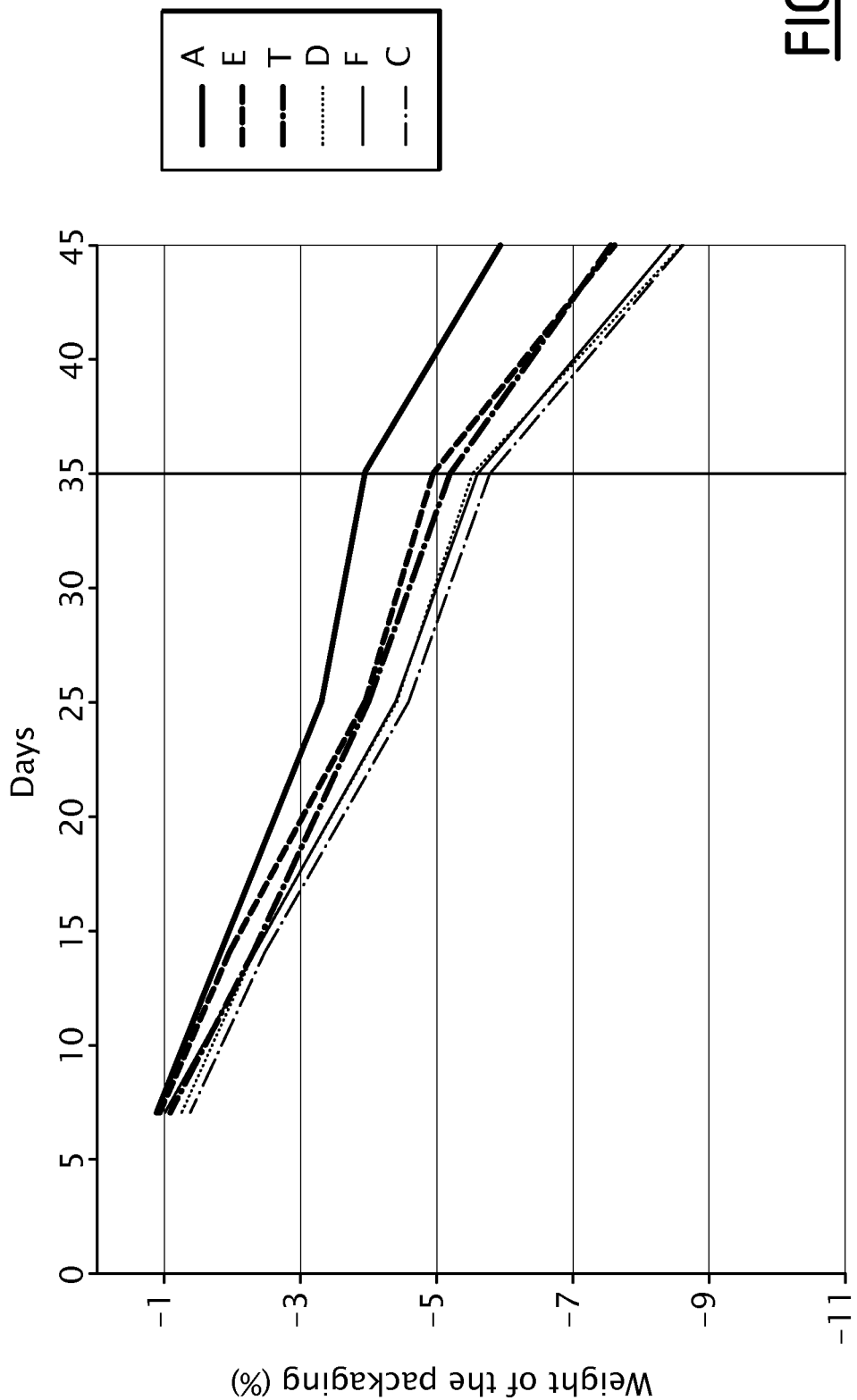
FIGS. 6 and 7 show respectively the weight of the packaging and the weight of the cheese product, as a function of the maturation time, for several packagings.

The weight of the packaging (including the packaging sheet and the wooden box) was monitored periodically, every 7 days. The weight curve is shown on FIG. 6.

Figure 7:
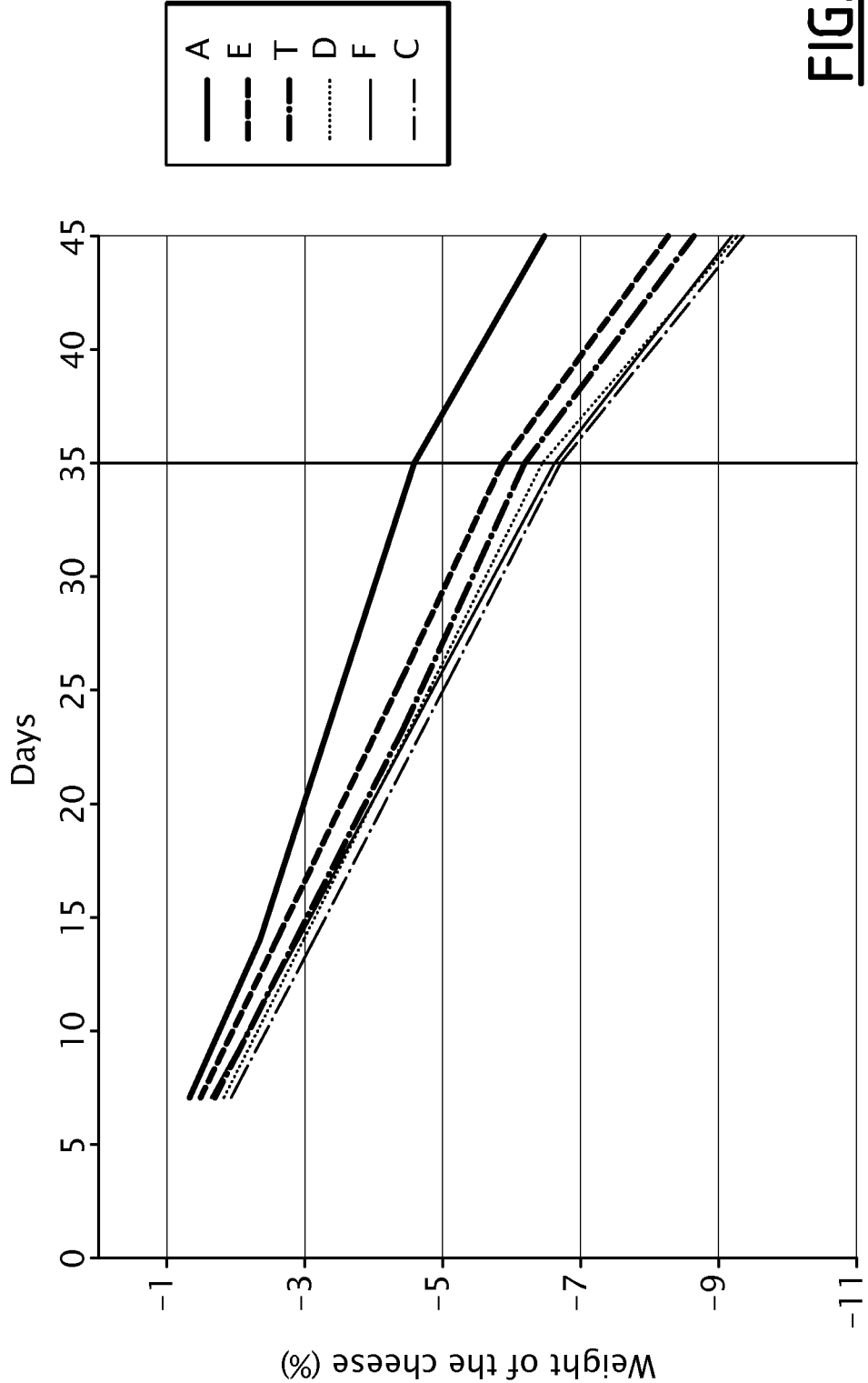

The weight of the cheese alone (not including the packaging sheet and the wooden box) was monitored periodically. The weight curve is shown on FIG. 7.

The cheese of each packaging was analyzed after 45 days in the packaging. The results are indicated in the table below.

|   |   | T | A | C | D | E | F |
| --- | --- | --- | --- | --- | --- | --- | --- |
| EST | g/kg | 448 | 436 | 453 | 452 | 443 | 455 |
| MG | g/kg | 220 | 214 | 222 | 219 | 216 | 221 |
| Ca | g/kg | 4.78 | 4.46 | 4.87 | 4.88 | 5.00 | 5.03 |
| NaCl | g/kg | 20 | 19.58 | 20.12 | 19.95 | 20.25 | 19.66 |
| pH H2O |   | 7.40 | 7.64 | 7.36 | 7.42 | 7.43 | 7.40 |
| HFD | % | 70.76 | 71.75 | 70.25 | 70.13 | 71.05 | 69.95 |
| G/S | % | 49.05 | 49.10 | 48.90 | 48.45 | 48.80 | 48.60 |
| Ca/ESD | % | 2.10 | 2.01 | 2.10 | 2.10 | 2.20 | 2.15 |
| NaCl/H2O | % | 3.62 | 3.47 | 3.68 | 3.64 | 3.63 | 3.60 |
| NS/NT | % | 90.0 | 87.8 | 89.6 | 88.5 | 86.6 | 89.6 |
| NPT/NT | % | 13.7 | 15.0 | 12.3 | 12.5 | 11.9 | 11.3 |

EST is the total dry extract. MG is the fat content. HFD is the moisture content of the defatted cheese. G/S is the fat to lean ratio. ESD is the dry extract excluding fats. NS is the quantity of nitrogen soluble in water. NT is the total quantity of nitrogen. NPT is the quantity of nitrogen soluble in phosphotungstic acid. The ratio NPT/NT is measured using the Kjeldhal method, according to the amended standard NF ISO8968-1.

A key parameter for the conservation time is the ratio NPT/NT, which is representative of the secondary proteolysis reaction. Said parameter is significantly lower for the packaging sheets according to the invention. The ratio NPT/NT is below 13%, and even below 12.5% for the four packaging sheets C to F. It is above 13.7 for the two other packaging sheets.

Furthermore, the appearance of the packaging is improved with the packaging sheets of the invention.

The invention claimed is:

1. Packaging sheet intended for packaging a cheese product, the packaging sheet comprising:
   an internal membrane comprising at least one internal plastic layer intended to be oriented towards the cheese product and at least a first water-absorbing layer made of a first water-absorbing material;
   a printable external surface, the external surface being intended to be oriented away from the cheese product;
   characterized in that the or each internal plastic layer has a plurality of microperforations arranged in a random fashion on the or each internal plastic layer in such a manner that the air permeability of the internal membrane is between 5 mL/min Bendtsen and 500 mL/min Bendtsen, the plurality of microperforations including through-holes that extend through the entire thickness of the at least one internal plastic layer and blind-holes whose length is smaller than the thickness of the at least one internal plastic layer, the first water-absorbing material having a water absorption rate is between 1 and 30 $g/m^2$ as measured using the COBB test $C_{3600}$;
   wherein the density of microperforations on an internal surface of the internal plastic layer is between 500 and 5000 microperforations per $dm^2$; and
   wherein the density of micropeforations is an average value of at least 50% of the surface area of the packaging sheet.

2. Packaging sheet according to claim 1, wherein the first water-absorbing material is a cellulose-based material.

3. Packaging sheet according to claim 1, wherein the first water-absorbing material has a surface weight of between 20 and 70 $g/m^2$.

4. Packaging sheet according to claim 1, wherein the plastic material forming the or each internal plastic layer comprises one of a petroleum-based plastic, a plastic derived from renewable sources or a blend of a petroleum-based plastic and a plastic derived from renewable sources.

5. Packaging sheet according to claim 1, wherein the greatest dimension of the microperforations of the or each internal plastic layer in the plane of the internal plastic layer is between 10 and 500 µm.

6. Packaging sheet according to claim 1, comprising an external layer at least partially bonded to the internal membrane, the external surface being formed by a surface of the external layer oriented away from the internal membrane.

7. Packaging sheet according to claim 6, wherein the external layer is made of a plastic material or an aluminum foil.

8. Packaging sheet according to claim 6, wherein the external layer is not perforated.

9. Packaging sheet according to claim 6 wherein the external layer is perforated.

10. Packaging sheet according to claim 6, wherein the external layer and the internal membrane are adhesively bonded to one another along a set of bonding points and/or lines, the adhesive being in particular a hot melt adhesive, a pressure-sensitive adhesive or a water-based adhesive.

11. Packaging sheet according to claim 6, wherein the external layer and the internal membrane are bonded to one another along their entire surface.

12. Packaging sheet according to claim 1, wherein the external surface is formed on the internal membrane.

13. Packaging sheet according to claim 1, the first water-absorbing layer being made of paper having a grammage between 30 and 40 g, the internal plastic layer being made of polyethylene having a surface weight between 10 and 12 $g/m^2$, wherein the air permeability of the internal membrane is between 10 mL/min Bendtsen and 50 mL/min Bendtsen, the first water-absorbing material having a water absorption rate of between 10 and 22 $g/m^2$ as measured using the COBB test $C_{3600}$.

14. Packaging comprising the packaging sheet according to claim 1 and a cheese product, arranged in the packaging sheet in such a way that the internal plastic layer is oriented towards the cheese product, the cheese product being one of a soft cheese, a fresh cheese or a blue cheese.

15. Packaging sheet according to claim 1 wherein the packaging sheet slows maturation of a cheese product in such a way that the NPT/NT ratio is lower than 13 after 45 days of maturation, NPT being the quantity of nitrogen soluble in phosphotungstic acid, NT being the total quantity of nitrogen, the ratio NPT/NT being measured using the Kjeldhal method, according to the amended standard NF IS08968-1.

16. Packaging sheet according to claim 11, wherein the external layer and the internal membrane are adhesively bonded to one another along their entire surface.

17. A package comprising:
    a cheese product; and
    a packaging sheet folded around the cheese product, the packaging sheet including:
      an internal membrane comprising at least one internal plastic layer oriented towards the cheese product and at least a first water-absorbing layer made of a first water-absorbing material;
      a printable external surface, the external surface being oriented away from the cheese product;
      characterized in that the or each internal plastic layer has a plurality of microperforations arranged in a random fashion on the or each internal plastic layer in such a manner that the air permeability of the internal membrane is between 5 mL/min Bendtsen and 500 mL/min Bendtsen, the plurality of microperforations including through-holes that extend through the entire thickness of the at least one internal plastic layer and blind-holes whose length is smaller than the thickness of the at least one internal plastic layer, the first water-absorbing material having a water absorption rate is between 1 and 30 $g/m^2$ as measured using the COBB test $C_{3600}$;
      wherein the density of microperforations on an internal surface of the internal plastic layer is between 500 and 5000 microperforations per $dm^2$; and
      wherein the density is an average value on at least 50% of the surface area of the packaging sheet.

18. Package according to claim 17 comprising an external layer at least partially bonded to the internal membrane, the external surface being formed by a surface of the external layer oriented away from the internal membrane, the air permeability of the external layer being greater than the air permeability of the internal membrane.

19. Packaging sheet according to claim 6 wherein the air permeability of the external layer is greater than the air permeability of the internal membrane.

20. Packaging sheet according to claim 7 wherein the air permeability of the external layer is smaller than the air permeability of the internal membrane.

* * * * *